Feb. 11, 1947. B. C. COONS 2,415,418
FRUIT PITTING MACHINE
Original Filed Aug. 26, 1940 2 Sheets-Sheet 1
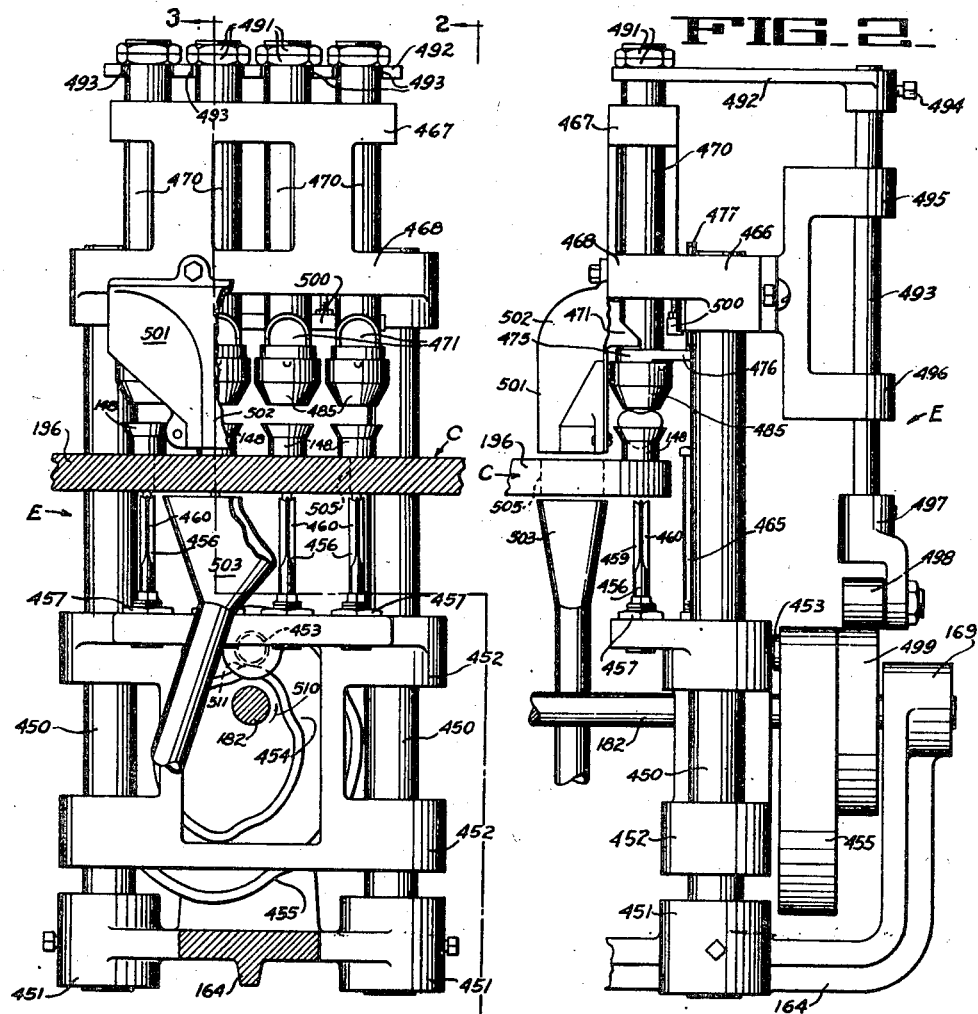
FIG_1. FIG_2.
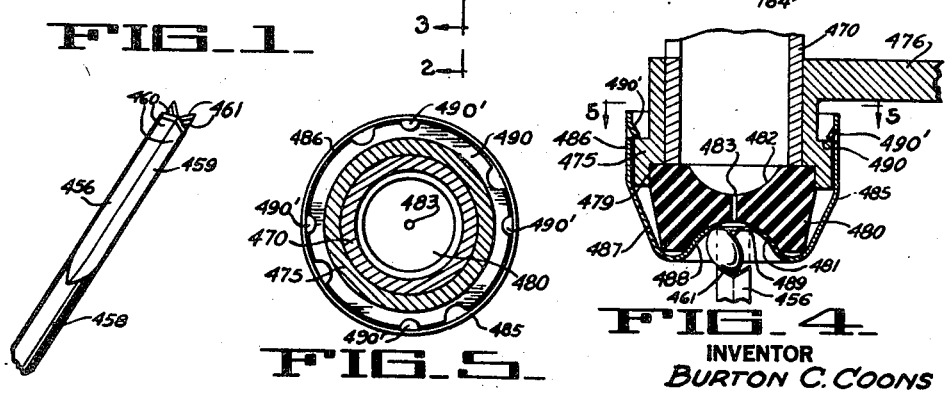
FIG_6. FIG_5. FIG_4.
INVENTOR
BURTON C. COONS
BY *Philip P. Minnis*
ATTORNEY

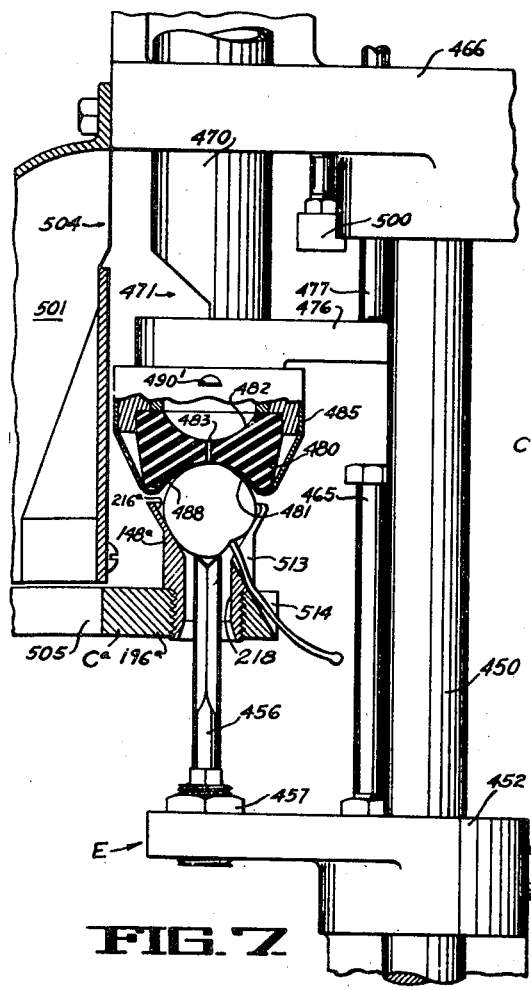
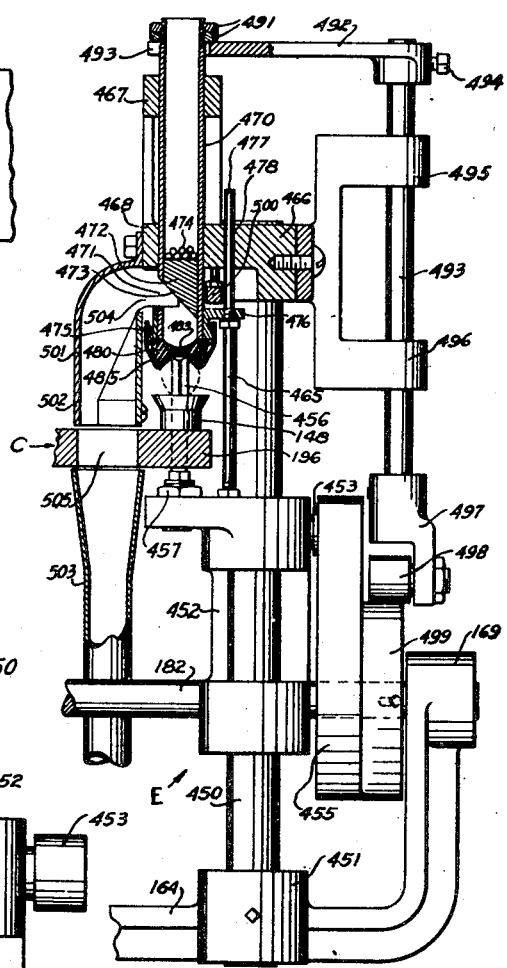
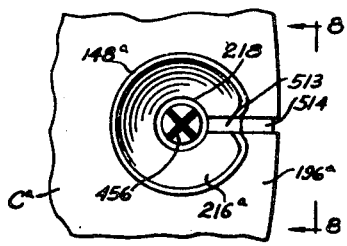
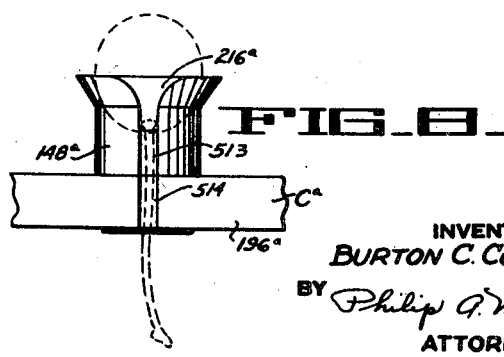

Patented Feb. 11, 1947

2,415,418

UNITED STATES PATENT OFFICE 2,415,418

FRUIT PITTING MACHINE

Burton C. Coons, San Jose, Calif., assignor to Food Machinery Corporation, San Jose, Calif., a corporation of Delaware Original application August 26, 1940, Serial No. 354,240. Divided and this application February 8, 1944, Serial No. 521,524

19 Claims. (Cl. 146—19)

The present invention relates to a machine for pitting fruit such as cherries or the like.

This application is a division of my copending application, Serial No. 354,240, filed August 26, 1940, for Fruit handling machine.

It is an object of this invention to provide an improved pitting mechanism for removing the pits of fruit in a very efficient manner without damage to the fruit.

Another object of this invention is to provide pitting mechanism which is automatically adjustable for various sizes of fruits.

Still another object of this invention is to provide means for maintaining the fruit, regardless of its size, in a fruit support during an initial incising or impaling of the fruit, so that the fruit will not be displaced incident to the actual pitting operation thus assuring removal of the pit along a predetermined axis of the fruit.

A further object is to provide a pitting mechanism for pitting cocktail cherries.

Other objects and advantages of the present invention will become apparent from the following description taken in connection with the accompanying drawings, in which:

Fig. 1 is a rear elevational view of the pitting mechanism, a portion of a fruit supporting turret being shown in section.

Fig. 2 is a side elevational view of the same as seen from line 2—2 in Fig. 1.

Fig. 3 is a vertical section of the pitting mechanism taken along line 3—3 in Fig. 1 with certain parts thereof in a different position.

Fig. 4 is an enlarged sectional detailed view of a pitting cup of the pitting mechanism.

Fig. 5 is a horizontal section through Fig. 4 taken along line 5—5 of the same.

Fig. 6 is a perspective view of a pitting tool employed in the pitting mechanism.

Fig. 7 is a modified turret construction together with the pitting mechanism disclosed in Fig. 3 for pitting cocktail cherries.

Fig. 8 is a side elevational view of a fruit holding cup employed in connection with the modified structure of Fig. 7 and as seen from line 8—8 in Fig. 9.

Fig. 9 is a fragmentary plan view of the modified turret seen in Fig. 7.

The fruit pitting machine of the present invention as will be best seen in Figs. 1, 2 and 3 comprises a turret C arranged to support cherries in alignment with a pit removing unit E after the stems of the cherries have been removed and the cherries positioned stem end up.

The turret C consists of a table 196 provided with a plurality of fruit holding members 148 which table is intermittently movable by mechanism (not shown) to intermittently arrange the fruit holding members in a predetermined indexed position incident to the pitting of the fruit.

The pitting mechanism is supported on vertical guide shafts 450 which are fixed within hub members 451 forming integral parts of a spider arm 164 extending laterally from a suitable standard (not shown). Slidably disposed upon the vertical guide shafts 450 is a pitting tool supporting bracket 452 provided with a roller 453 positioned within a cam way 454 of a rotary cam 455. The rotary cam 455 is fixed upon a shaft 182 having one end journaled in a boss 169 on a vertical portion of the spider arm 164 and its opposite end suitably supported for rotation in any well known manner beneath the turret C. The shaft 182 is driven in the direction of the arrow 510 in Fig. 1 by any conventional gear drive suitably connected to a power source such as electric motor (not shown). The supporting bracket 452 is provided with a plurality of pitting tools 456 which are threadably secured to the same and held in proper predetermined position by means of lock nuts 457.

These pitting tools (see Fig. 6) consist of a lower shank portion 458 and an upper portion 459 comprising a plurality of radially extending pitting blades 460 which have sharpened edges at their upper ends 461. The outer portions of the sharpened edges 461 of the pitting tools are somewhat higher than the center portions thereof, so that the edges 461 form a pocket for the reception of the pit, as will be best seen from Fig. 4.

The pitting tools are positioned in axial alignment with each series of fruit holding and supporting cups 148 when the latter are in proper indexed position above the pitting tools. When the supporting bracket 452 is raised, the pitting tools will enter through openings 218 formed in the cups 148 and will travel upwardly within said cups and through the same for performing the pit ejecting operations, which will be specifically described later on. The raising and lowering of the pitting tools 456 and the supporting bracket 452 is effected by means of the roller 453 and rotary cam 455 upon rotation of the shaft 182.

Adjustably mounted upon the pitting tool supporting bracket 452 are a plurality of lift rods 465 which are parallel with the pitting tools and laterally spaced therefrom.

Fixed to the upper ends of the guide shafts 450 is a pitting tube supporting bracket 466 which comprises bearing portions 467 and 468 within which a plurality of pitting tubes 470 are slidably disposed. The pitting tubes 470 are in axial alignment with each series of fruit supporting cups 148 when the same are in proper indexed position with respect to the pitting tools. The tubes 470 are provided with openings 471 and are filled with lead as shown at 472. The lower ends of the lead fillings 472 form inclined deflecting surfaces 473 adjacent the openings 471. Weights or lead shot 474 are placed within the pitting tubes to give the same the proper weight necessary for the pitting operation.

Secured to the lower open ends of the pitting tubes 470 are ring members 475 (see Fig. 4) provided with ears 476 within which guide pins 477 are fixed (see Fig. 3). The guide pins 477 extend upwardly from the ears 476 through openings 478 within the supporting bracket 466. The lower ends of the ring members 475 comprise a circular recess 479 within which pitting cups 480 are received.

These pitting cups are made from flexible material such as rubber or the like, and are each provided with a lower spherical recess 481 and an upper spherical recess 482 which is in communication with the lower open end of each pitting tube. The pitting cups are further provided with a small aperture 483 positioned in the center of the same as will be clearly seen from Fig. 4. The pitting cups 480 are of frusto conical configuration and are held in proper position within the circular recess 479 of the ring members 475 and in contact with the lower ends of the pitting tubes 470 by means of pitting cup retaining members 485. Each of these retaining members includes a cylindrical sleeve portion 486 within which the lower end of the cooperating ring member 475 is received, a frusto conical portion 487, and a pit guide portion 488, extending upwardly into the spherical recess 481 of the pitting cup associated therewith. This pit guide portion 488 of each retaining member 485 is open at its upper end 489 adjacent the aperture 483 of the pitting cup associated therewith, so as to permit the passage of the pitting tool 456 cooperating therewith. Each ring member 475 is provided with an annular flange forming a shoulder 490 to which the pitting cup retaining members 485 are secured in any convenient manner, as shown at 490'.

The pitting tubes 470 are threaded at their upper ends and positioning nuts 491 are screwed thereon. A lift bracket 492 provided with a plurality of slots 493 within which the pitting tubes 470 are received is fixed to the upper end of an actuating shaft 493 by means of a set screw 494. The actuating shaft 493 is slidably mounted within bearing portions 495 and 496 secured to the pitting tube supporting bracket 466. The lower end of the actuating shaft 493 carries a socketed bracket 497 provided with a roller 498 which engages a cam portion 499 of the rotary cam 455 which is keyed to the shaft 182. An adjustable stop member 500 secured to the pitting tube supporting bracket 466 is employed for limiting the upward movement of the pitting tubes 470.

Attached to the supporting bracket 466 adjacent the pitting tubes 470 is a pit discharging chute 501 which comprises an upper chute portion 502 and a lower chute portion 503 positioned above and below respectively of the table 196 of the turret C. The upper chute portion 502 comprises an opening 504 which is adjacent the openings 471 of the pitting tubes (see Fig. 3).

The pits discharged from the pitting tubes fall into the upper chute portion 502 through the opening 504 and through openings 505 of the table 196 of the turret C into the lower pit discharge chute portion 503 and are discharged from the machine.

Upon indexing of the table 196 by mechanism described in my aforementioned copending application, the fruit holding cups and stemmed cherries positioned therein are now in proper alignment with the pitting tubes and pitting tools of the pitting mechanism of the machine. The pitting tubes 470 are in raised position and the pitting tools 456 are in their lowermost position, as clearly shown in Fig. 2.

Upon further rotation of the shaft 182 in the direction of the arrow 510 (see Fig. 1) cam 499 disengages from the roller 498, the pitting tubes 470 drop down and the pit guide portions 488 of the pitting cup retaining members 485 engage the cherries at the stem ends thereof regardless of the size of the fruit, and the pitting cups 480 and pitting tubes 470 are thereby properly positioned with respect to the fruit.

Incident to the downward movement of the pitting tubes 470 the pitting tools 456 move upwardly. This upward movement of the pitting tools is effected by the rotation of cam 455 which engages the roller 453 secured to bracket 452.

During their upward movement the pitting tools 456 move upward into the fruit holding cups 148, which are in alignment therewith and enter into the cherries at the blossom ends thereof cutting radially extending incisions into the meat of the cherries.

The weight of each of the pitting tubes is sufficient to permit entry of the pitting tools into the cherries without raising the cherries. The pitting tools continue their upward travel through the meat of the fruit until the upper edges 461 of the pitting tools 456 engage the pits of the fruit. During the pitting action of the pitting tools 456 the pits are received within the pockets formed by the cutting edges 461 of the blades 460 and are seated therein to be properly guided into the aperture 483 of the pitting cups. The pit guide portions 488 of the pitting cup retaining members 485 will assist in guiding the pits to prevent fouling of the pitting cups by the pits (see Fig. 4). As the pitting tools engage the pits the cherries are securely impaled on the pitting tools and thereafter the cherries are lifted out of the fruit holding cups 148 thus raising the pitting tubes.

When the ears 476 of the ring members 475 contact the stop members 500 carried by the pitting tool supporting bracket 466 further upward movement of the pitting tubes is prevented thus holding the cherries at an elevated plane and while the pitting tools continue their upward movement they force the pits through the meat portion between the pits and the stem ends of the cherries to eject the pits from the fruit. The upward movement of the pitting tools 456 is now accelerated by the inclined portion 511 of cam way 454 of the cam 455, and the pits are knocked through the apertures 483 of the pitting cups 480 which expand to permit the passage of the pits. The maximum rise of the pitting tools 456 is just short of entering into the body of the flexible pitting cups.

The resilient action of the pitting cups snaps the pits in an upward action to pass the pits through the apertures 483 and the pits strike the deflecting surface 473 and are directed through the openings 471 into the pit discharge chute 501.

During the pitting operation above described the stem ends of the cherries are in contact with the flexible pitting cups and very little rupture at the stem ends of the cherries is caused during the removal of the pits. The blades 460 of the pitting tools are very thin and their cutting edges 461 are very sharp so that the incisions at the blossom ends of the cherries are practically invisible in the finished fruit.

When the pits are removed from the fruit in a manner as above stated, the ears 476 of the ring members 475 of the pitting tubes 470 engage the lifting rods 465 on the bracket 452 and prevent the entry of the pitting tools into the pitting cups. These lifting rods function further to prevent the entry of the pitting tools into the pitting cups when there are no cherries in the fruit holding cups 148, so that damage of the pitting cups by the pitting tools under any condition is avoided.

Upon completion of the above described operations, the pitting tools are lowered and the pitted cherries impaled upon the same are placed back into the fruit holding cups 148 in their proper centered relation with respect thereto. During the downward movement of the pitting tools from the position shown in Fig. 3 to the position shown in Fig. 2, the same are retracted from within the central bore of the fruit holding cups and disengaged from the fruit. The pitting tubes 470 are held in their uppermost position by engagement of the hill portion of cam 499 with the roller 498.

The turret indexing mechanism (not shown) causes another indexing operation of the turret C and table 196 is intermittently moved, advancing the series of fruit holding cups 148 and the pitted cherries therein from beneath the pitting cups to position a new and different series of cups 148 with unpitted cherries therein beneath the pitting cups for a like operation.

If it is desired to pit cocktail cherries, a modified turret structure C<sup>a</sup> (see Fig. 7) is employed. This turret structure comprises a table 196<sup>a</sup> and a plurality of fruit holding cups 148<sup>a</sup> arranged in series in the same manner as the fruit holding cups 148 on the table 196 previously described. The turret structure C<sup>a</sup> differs from the turret structure C only insofar as the fruit holding cups 148<sup>a</sup> and table 196<sup>a</sup> are provided with stem receiving slots 513 and 514 respectively. The slot 513 of each fruit holding cup 148<sup>a</sup> (only one cup 148<sup>a</sup> being shown in Figs. 7 to 9 inclusive) extends through the wall of the conical fruit receiving portion 216<sup>a</sup> in a declined direction toward the periphery of the table 196<sup>a</sup>. The slots 514 in the table 196<sup>a</sup> are in alignment with the slots 513 and form the continuation thereof.

When the turret structure C<sup>a</sup> is employed the cherries are manually fed into the fruit holding cups 148<sup>a</sup> and are so positioned therein that the stems of the cherries are received within the slots 513 and 514 with their ends protruding in downwardly declined directions from the periphery of the table 196<sup>a</sup>, the stem-blossom axis of the cherry being disposed at an angle with respect to vertical as clearly shown in Fig. 7. Thereupon turret C<sup>a</sup> is indexed to advance the cherries to the pitting mechanism E where the pitting operations are performed in the same manner as previously described herein in connection with the turret C with the exception that the pitting tools 456 now enter the stem ends of the cherries at a point adjacent the roots of the stems without dislocating the stems by reason of the weighted tubes 470 holding the cherries in proper position during the initial incising or impaling operation. Thereafter the pits are severed from the stems and are removed adjacent the blossom ends of the cherries, the pitted fruit finally being reseated in the cups 148<sup>a</sup> with stems attached as will be apparent in Fig. 7.

It is contemplated that the cherries may be placed in the fruit supporting cups 148 or 148<sup>a</sup> by either automatic means or manually as desired.

When the cherries are pitted in the manner as illustrated in Figs. 7 to 9 inclusive, it will be noted that the pits are removed without loosening the stems from the meat of the fruit and that the stems remain firmly attached to the fruit.

Having thus described in detail the construction of my improved pitting machine, I will now give a brief résumé of the operation of my structure.

Operation

While the turret C is being moved into a position to index the series of fruit holding cups 148 with the several pitting tools, the pitting tubes 470 are in their uppermost position and the pitting tools 456 are retracted below the table 196 of the turret C.

When the series of fruit holding cups 148 is in proper indexed position with respect to the pitting mechanism E the pitting tubes drop downward and the pit guides 488 engage the stem ends of the cherries. The pitting tools 456 are raised and enter the cherries at the blossom ends thereof, the fruit being weighed down by the weight of the tubes 470 and the lead shot 474 carried thereby until the tip edges 461 of the tools engage the pits and raise the cherries and pitting tubes 470 so that the fruit are thereby lifted out of the cups. In this manner the cherries are at all times held by the weight of the tubes 470 until the cherries are properly impaled upon the pitting tools. When the ears 476 engage the stop 500 the pitting tubes 470 are held against further upward movement and while the pitting tools continue their upward movement at an accelerated speed the pits are pressed through the meat at the stem ends of the fruit and are forced through the apertures 483 in the pitting cups. While the pits pass through the apertures 483 they are snapped upwardly by the resilient cups into the pitting tubes against the deflecting surface 473 and are directed into the upper pit discharge chute portion 502 of the pit discharge chute 501 from which they are discharged in a manner as previously stated herein.

The pitting tools 456 have now reached the uppermost position and the cam 499 and roller 498 as well as the lifting rods 465 which engage the ears 476, hold the pitting cups in proper relation with respect to the pitting tools so that the latter will not enter into the body portion of the cups.

Thereupon the pitting tools 456 are lowered and the cherries impaled upon the pitting tools are placed back into the series of holding cups 148 in proper centered relation with respect thereto. While the pitting tools 456 continue their downward movement to their original position below the turret C and are disengaged from the fruit, the pitting tubes 470 are held in their uppermost position by the cam 499 and roller 498.

When the pitting tools 456 are in their retracted position and the pitting tubes 470 remain in their uppermost position, the turret C is again indexed and the series of fruit holding cups 148 and the stemmed and pitted fruit supported thereby are moved into alignment with a reshaping mechanism (not shown) and simultaneously a new and different series of unpitted fruit is moved into alignment with the pitting mechanism E.

When the turret structure C<sup>a</sup> is employed and the machine is used for pitting cocktail cherries the operation is the same as hereinbefore explained in that the cocktail cherries are impaled upon the pitting tool while the cherries are maintained down on the fruit holding cups 148<sup>a</sup> thus assuring that the cherries will not be displaced into any other position and that the pits will be removed along a predetermined axis of the cherries. By this arrangement there is a positive assurance that the cocktail cherries will be reseated in their respective fruit holding cups 148<sup>a</sup> with their attached stems extending obliquely downwardly within the slots 513 and 514 formed in the cups 148<sup>a</sup> and table 196<sup>a</sup> respectively so that the cherries are in proper position for treatment by a reshaping mechanism as explained in my copending application hereinbefore referred to.

While I have described a particular improvement of the present invention, it will be understood that various changes and modifications may be made without departing from the spirit of the present invention and the scope of the appended claims.

Having thus described my invention and in what manner the same may be used, what I claim as new and desire to protect by Letters Patent is:

1. A fruit pitting machine comprising fruit holding means, a tube movably mounted above the fruit holding means, a flexible perforated pitting cup carried by said tube above the fruit holding means for engaging the stem end of the fruit presented thereto by the holding means, pit ejecting means associated with the holding means, and means for operating the pit ejecting means for impaling the fruit from the blossom end thereof and forcing the pit through the stem end of the fruit and into the perforation of the pitting cup.

2. A fruit pitting machine comprising fruit holding means, a tube movably mounted above the fruit holding means and having a pit discharge opening, a flexible perforated pitting cup carried by said tube above the fruit holding means for engaging the stem end of the fruit presented thereto by the holding means, pit ejecting means associated with the holding means, means for operating the pit ejecting means for impaling the fruit from the blossom end thereof and for forcing the pit through the stem end of the fruit and the perforation of the pitting cup into the tube, and means for discharging the pit through the opening in the tube.

3. A fruit pitting machine comprising fruit holding means, a flexible pitting cup having an aperture, means for movably mounting the pitting cup above said fruit holding means and in alignment therewith, means for releasing the pitting cup for engagement with the fruit presented thereto by the holding means, pit ejecting means associated with the fruit holding means, means for operating the pit ejecting means for impaling the fruit and for forcing the pit from the fruit into the aperture of the pitting cup, means associated with the pitting cup for guiding the pit into the aperture of said cup, and means for maintaining the pitting cup in predetermined relation with respect to the pit ejecting means to prevent entry of the latter into the pitting cup.

4. A fruit pitting machine comprising fruit holding means, a flexible pitting cup provided with an aperture, a pitting tube for supporting the pitting cup above the fruit holding means in alignment therewith, means for releasing the pitting tube to engage the pitting cup with fruit presented thereto by the fruit holding means, pit ejecting means movably mounted below the fruit holding means, means for moving the pit ejecting means toward the pitting cup for impaling the fruit and for forcing the pit from the same into the aperture in the pitting cup, whereby upon engagement of the pit by said pit ejecting means the fruit is lifted from the fruit holding means and the pitting cup and tube are raised by the pitting pressure of the pit ejecting means against the pit, means for limiting the upward movement of the pitting tube and cup, and means for maintaining the position of the pit ejecting means within predetermined limits with respect to the pitting cup.

5. A fruit pitting machine comprising fruit holding means, flexible means having an orifice and yieldably engageable with the fruit presented thereto by the fruit holding means for maintaining the fruit in a predetermined position regardless of its size, means for impaling the fruit to engage the pit and for urging the fruit and flexible means away from the fruit holding means, and means for limiting the movement of the flexible means whereby the pit is forced through the meat of the fruit into the orifice of the flexible means by said impaling means.

6. A fruit pitting machine comprising fruit holding means, flexible means having an orifice and yieldably engageable with the fruit presented thereto by the fruit holding means for maintaining the fruit in proper position therein regardless of its size, means for impaling the fruit to engage the pit and for urging the fruit from the fruit holding means against said flexible means causing yielding movement thereof, means for limiting the yielding movement of the flexible means whereby the pit is forced through the meat of the fruit into the orifice of the flexible means by said impaling means, and means associated with the impaling means for preventing entry of the latter into the flexible means.

7. A fruit pitting machine comprising fruit holding means for supporting the fruit in a predetermined position, a flexible pitting cup having an orifice, means for movably mounting the pitting cup above the fruit holding means, means for releasing the pitting cup for engaging the fruit presented thereto by the fruit holding means to maintain the fruit in said predetermined position, means for impaling the fruit to engage the pit of the fruit for lifting the fruit from the fruit holding means against the weight of the pitting cup to thereby raise the same, means for limiting the upward movement of the pitting cup whereby the pit is forced through the meat of the fruit into the orifice of the pitting cup, and means for lowering the impaling means for returning the pitted fruit into the fruit holding means in said predetermined position.

8. A fruit pitting machine comprising fruit holding means, a flexible pitting cup having an orifice, means for movably mounting the pitting cup above the fruit holding means, means for lowering the pitting cup with respect to the fruit holding means for engaging the fruit presented thereto by the fruit holding means, means for impaling the fruit to engage the pit of the fruit for lifting the fruit above the fruit holding means against the weight of the pitting cup to thereby raise the same, means for limiting the upward movement of the pitting cup whereby the pit is forced through the meat of the fruit into the orifice of the pitting cup, means associated with the impaling means for maintaining the pitting cup in predetermined relation with respect to the impaling means, and means for lowering the impaling means for returning the pitted fruit into the fruit holding means.

9. A fruit pitting machine comprising fruit holding means for supporting the fruit in a predetermined position, a flexible pitting cup having an orifice, means for movably mounting the pitting cup above the fruit holding means and in axial alignment therewith, means for lowering the pitting cup with respect to the fruit holding means for engaging the fruit presented thereto by the fruit holding means to maintain the fruit in said predetermined position, means for impaling the fruit while the latter is maintained in said predetermined position and for engaging the pit to lift the fruit from the fruit holding means against the weight of the pitting cup to thereby raise the latter, means for limiting the upward movement of the pitting cup whereby the pit is forced through the meat of the fruit into the orifice of the pitting cup, means associated with the impaling means for holding the pitting cup in predetermined relation with respect to the impaling means, and means for lowering the impaling means for returning the pitted fruit into the fruit holding means in said predetermined position with respect to the same.

10. A fruit pitting machine comprising fruit holding means having a stem receiving slot formed therein for supporting the fruit with its stem-blossom axis angularly disposed relative to vertical, flexible means having an orifice and gravitationally engageable with the fruit presented thereto by the fruit holding means to maintain the fruit with its stem-blossom axis angularly disposed, means for impaling the fruit and engaging the pit of the fruit to one side of its stem-joining end and for lifting the fruit and the flexible means upward relative to the fruit holding means, and means for limiting the upward movement of the flexible means whereby to sever the pit from its stem and to force said pit through the meat of the fruit into the orifice of said flexible means.

11. A machine for pitting unstemmed fruit comprising a pitting tool movable in a predetermined path, fruit holding means having a stem support for holding the stem of the fruit at a predetermined angle relative to and out of the path of movement of the pitting tool, and means for moving the pitting tool to impale the fruit and remove the pit therefrom without removing the stem from the fruit.

12. A machine for pitting unstemmed fruit comprising a movable pitting tool, fruit holding means having a stem guide for engaging the stem of the fruit to support the stem at an oblique angle relative to and out of the path of movement of the pitting tool and with the stem blossom axis of the fruit traversing the path of movement of the pitting tool substantially at the center of the pit of the fruit, and means for moving the pitting tool into the fruit for removing the pit therefrom in a direction away from the stem without removing the stem from the fruit.

13. In a machine for pitting unstemmed fruit including a pitting tool and means for moving the same in a predetermined path, fruit holding means for supporting the fruit with its pit disposed in the path of movement of said pitting tool and having a stem engaging portion for supporting the stem of the fruit out of the path of movement of said pitting tool to thereby position the fruit with its stem blossom axis at a predetermined angle relative to the pitting tool whereby upon movement of the latter the pit is removed from the fruit without removing the stem from the fruit.

14. In a machine for pitting unstemmed fruit including a pitting tool and means for moving the same in a predetermined path, fruit holding means for supporting the fruit with its pit disposed in the path of movement of the pitting tool, said fruit holding means having a slot for receiving the stem of the fruit to support the stem in a predetermined angular relation with respect to and out of the path of movement of the pitting tool whereby upon movement of the latter to pit the fruit the pit is severed from the stem without removing the stem from the fruit.

15. A fruit pitting machine comprising fruit holding means, means reciprocable toward and away from said fruit holding means and including a flexible pitting cup having an orifice, means for moving said reciprocable means away from said fruit holding means and for permitting movement of the reciprocable means toward the fruit holding means into yielding engagement with a fruit supported therein to maintain the fruit in a predetermined position in the fruit holding means, means for impaling the fruit to engage its pit and for lifting the fruit from the fruit holding means against the yielding resistance of said reciprocable means, and means for limiting the yielding movement of said reciprocable means whereby the pit is forced through the meat of the fruit and into the orifice of said pitting cup by said impaling means.

16. A fruit pitting machine comprising fruit holding means, means reciprocable toward and away from said fruit holding means and including a flexible pitting cup having an orifice, means for moving said reciprocable means away from said fruit holding means and for permitting movement of the reciprocable means toward the fruit holding means into yielding engagement with a fruit to maintain the fruit in a predetermined position in the fruit holding means, means for impaling the fruit to engage its pit and for lifting the fruit from the fruit holding means against the yielding resistance of said reciprocable means, means for limiting the yielding movement of said reciprocable means whereby the pit is forced through the meat of the fruit and into the orifice of said pitting cup by said impaling means, and means operable with said impaling means for preventing entry of the latter into said pitting cup.

17. A fruit pitting machine comprising fruit holding means, flexible means having an orifice and being reciprocable toward and away from said fruit holding means, means for controlling the reciprocable movement of said flexible means and yieldably associated therewith for permitting movement of the flexible means into yielding engagement with a fruit presented thereto by said fruit holding means to maintain the fruit regardless of its size in a predetermined position therein, means for impaling the fruit and for engaging the pit to urge the fruit against the flexible means, and means for limiting the yieldable movement of said flexible means whereby the pit is forced through the meat of the fruit and into the orifice of said flexible means by said impaling means.

18. A fruit pitting machine comprising fruit holding means, means movable toward and away from said fruit holding means, reciprocable means yieldably associated with said movable means and including a flexible pitting cup having an orifice, means for moving said movable means toward said fruit holding means whereby said pitting cup is moved into yieldable engagement with a fruit in the fruit holding means to maintain the fruit in proper position for pitting regardless of its size, means for limiting the yieldable movement of said reciprocable means, and means for impaling the fruit to engage the pit and for urging the fruit against said pitting cup until the pit is forced through the meat of the fruit and into the orifice of said pitting cup.

19. A fruit pitting machine comprising fruit holding means, means movable toward and away from said fruit holding means, reciprocable means yieldably associated with said movable means and including a flexible pitting cup having an orifice, means for moving said movable means toward said fruit holding means whereby said pitting cup is moved into yieldable engagement with a fruit in the fruit holding means to maintain the fruit in proper position for pitting regardless of its size, means for limiting the yieldable movement of said reciprocable means, means for impaling the fruit to engage the pit and for urging the fruit against said pitting cup until the pit is forced through the meat of the fruit and into the orifice of said pitting cup, and means operatively associated with said reciprocable means and said impaling means for preventing entry of the latter into the orifice of said pitting cup.

BURTON C. COONS.

REFERENCES CITED

The following references are of record in the file of this patent:

UNITED STATES PATENTS

| Number | Name | Date |
|---|---|---|
| 687,022 | Harris | Nov. 19, 1901 |
| 2,157,518 | Ashlock | May 9, 1939 |
| 2,243,530 | Kok | May 27, 1941 |